United States Patent [19]
Kinford, Jr.

[11] 4,357,045
[45] Nov. 2, 1982

[54] METHOD AND APPARATUS FOR REDUCING AIR DRAG ON TRUCK TYPE WHEELED VEHICLES

[76] Inventor: Harold G. Kinford, Jr., 3459 Ensign Cove, Aurora Shores, Ohio 44202

[21] Appl. No.: 205,561

[22] Filed: Nov. 10, 1980

Related U.S. Application Data

[63] Continuation of Ser. No. 957,651, Nov. 3, 1978, abandoned.

[51] Int. Cl.³ .............................................. B62D 35/00
[52] U.S. Cl. ....................................................... 296/1 S
[58] Field of Search ................................. 296/1 S, 91

[56] References Cited

U.S. PATENT DOCUMENTS

| | | | |
|---|---|---|---|
| 2,514,695 | 7/1950 | Dempsey | 296/1 S |
| 2,863,695 | 12/1958 | Stamm | 296/1 S |
| 3,328,074 | 6/1967 | Rossem | 296/1 S |
| 3,419,897 | 12/1968 | Bratsberg | 296/91 |
| 3,647,256 | 3/1972 | Cox | 296/91 |
| 3,910,623 | 10/1975 | McKeen | 296/1 S |
| 4,022,508 | 5/1977 | Kirsch et al. | 296/1 S |

*Primary Examiner*—Richard A. Bertsch
*Attorney, Agent, or Firm*—Meyer, Tilberry & Body

[57] ABSTRACT

A tubular air screen producing device is mountable on a draft vehicle adapted to tow a trailing vehicle therebehind and has an air inlet end in the direction of towing and an air outlet end for discharging a screen of air toward the horizontal and vertical edges of the front end of the trailing vehicle. The outlet end of the device is of smaller area than the inlet end and is configured to direct a screen of air toward the trailing vehicle edges at a velocity higher than the velocity of air relative to the draft vehicle moving at a given velocity relative to ground. The high velocity air screen streamlines the area between the draft and trailing vehicles and shrouds the space therebetween, so as to minimize air turbulence in the space and along the top and side walls of the trailing vehicle. Thus, air drag is reduced and fuel economy is increased in connection with the towing of a trailing vehicle.

14 Claims, 6 Drawing Figures

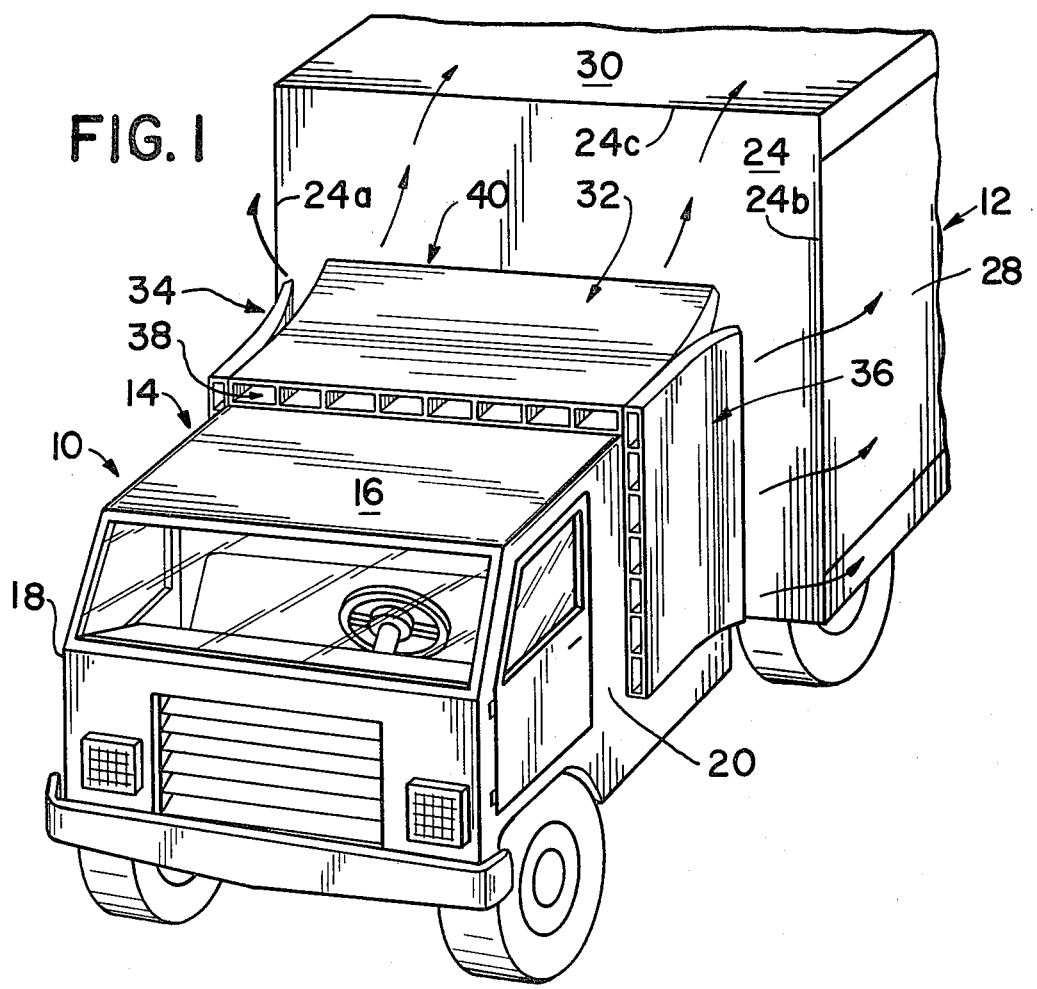
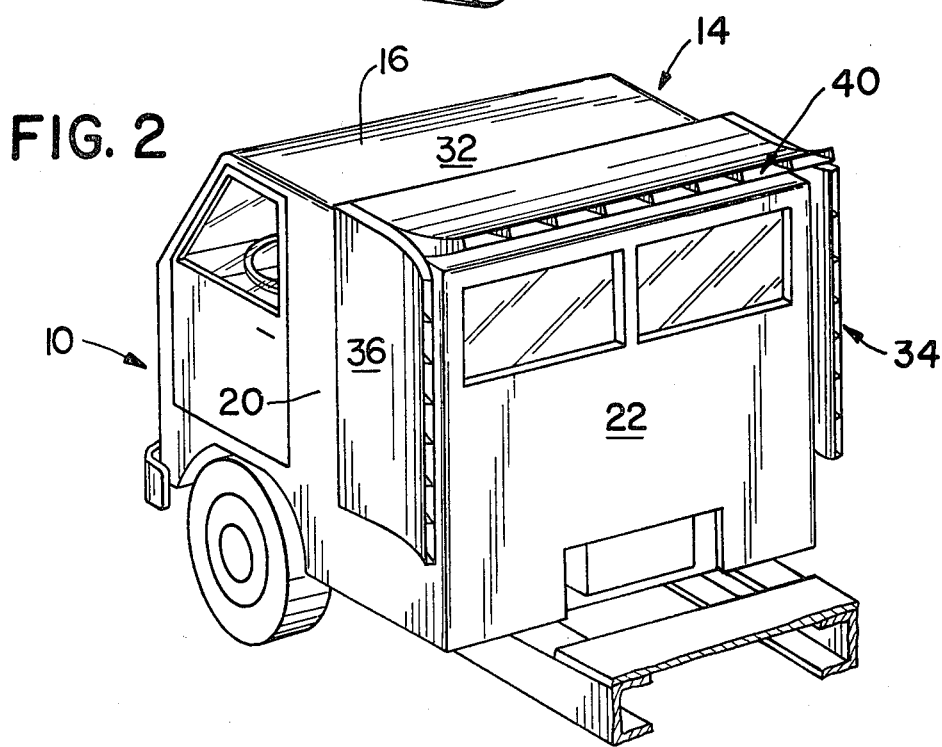

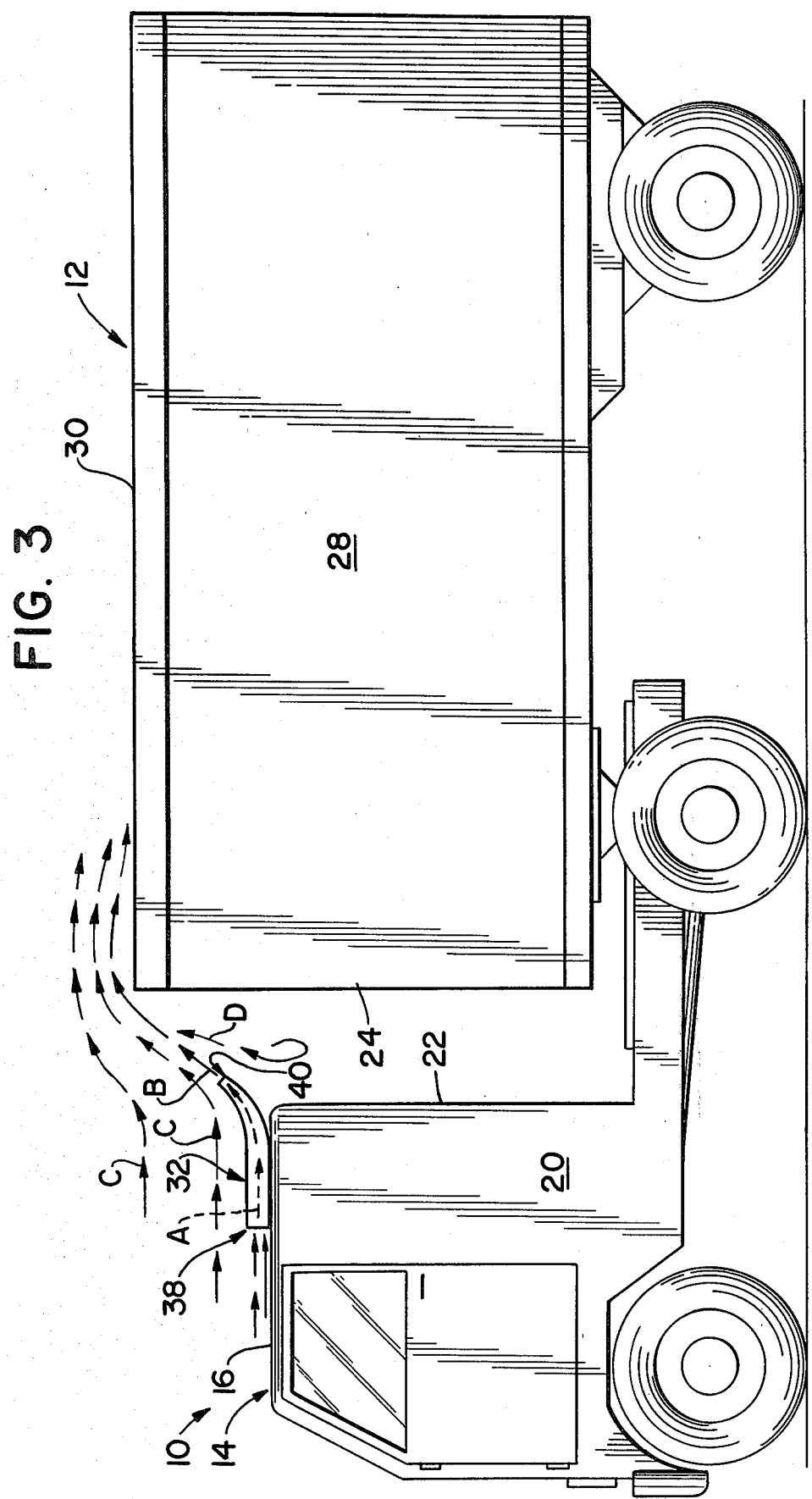

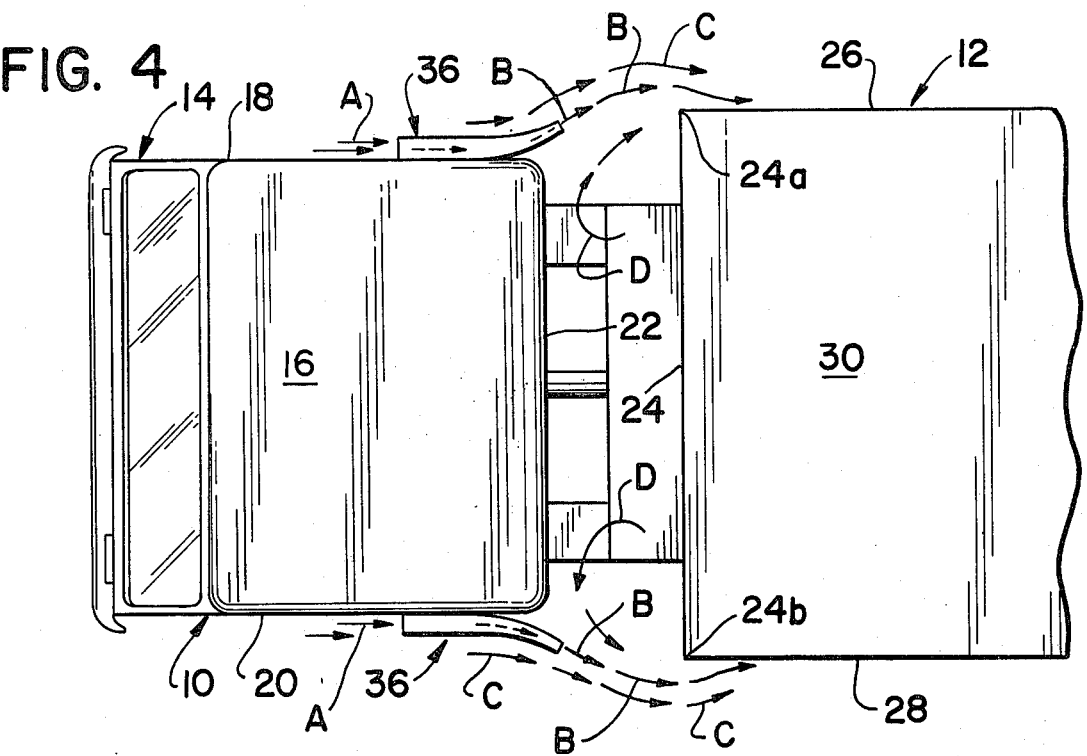
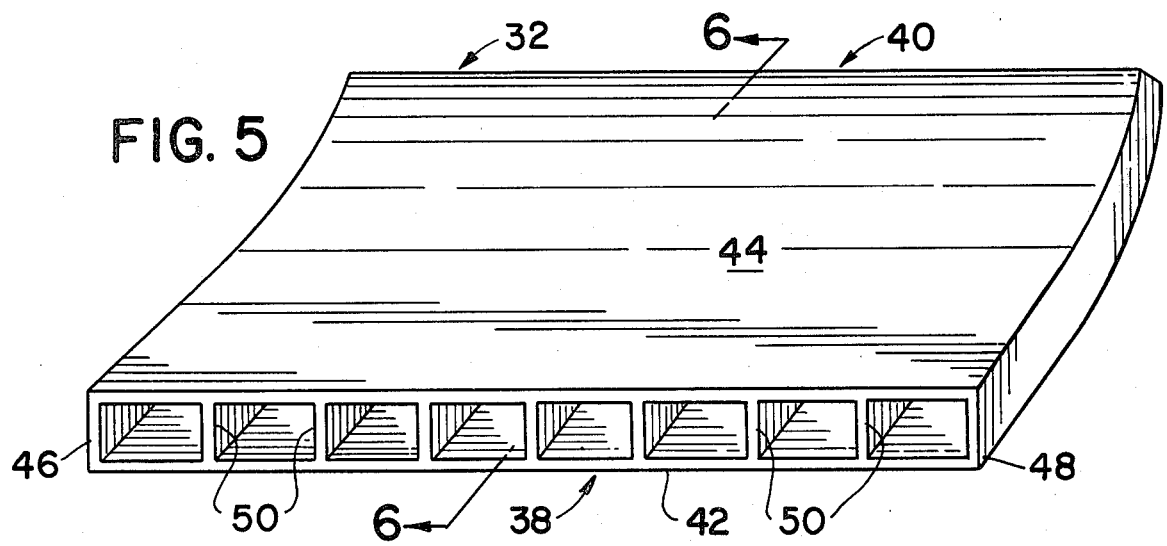
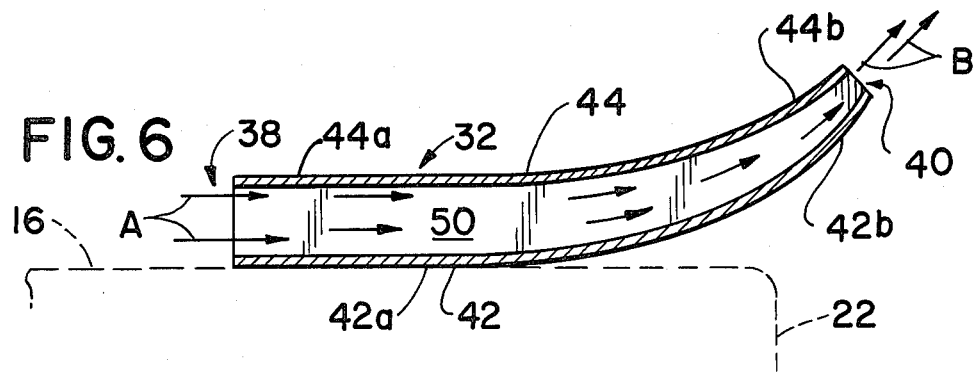

METHOD AND APPARATUS FOR REDUCING AIR DRAG ON TRUCK TYPE WHEELED VEHICLES

This is a continuation of application Ser. No. 957,651 filed Nov. 3, 1978 now abandoned.

BACKGROUND OF THE INVENTION

This invention relates to the art of land vehicles and, more particularly, to controlling air flow between portions of truck type wheeled vehicles to reduce turbulence and air drag thereon during movement along a roadway.

The present invention find particular utility in connection with truck type vehicles generally called tractor-trailer units in which the tractor is the draft vehicle and the trailer has an articulated connection therwith and is towed thereby as the trailing vehicle. Accordingly, the invention is disclosed and described herein in conjunction with such a draft and trailing vehicle combination. At the same time, it will be appreciated that the invention is applicable to truck type vehicles other than articulated draft and trailing vehicle combinations such as, for example, a unitary truck structure having a power plant and cab on the front portion of the truck frame and a storage compartment on the rear portion of the frame and having a front wall at or spaced behind the rear wall of the cab and projecting laterally outwardly and/or vertically above the side and top walls of the cab.

It is of course well known in connection with the towing of a trailing vehicle along a roadway that considerable energy in the form of fuel consumption is required to overcome air resistance and air drag on the trailing vehicle. In this respect, with regard for example to the common tractor-trailer combination, the trailer includes a wall at the front end thereof spaced behind the cab of the tractor, whereby air flowing rearwardly along the tractor in response to movement of the tractor-trailer along a roadway enters the space therebetween and creates a vortex effect or air turbulence in the space. Moreover, air flowing across the space impinges directly against portions of the front wall of the trailer which extend vertically above and/or laterally outwardly of the top and side walls of the cab of the tractor. Still further, air flowing laterally upward and outwardly along the front wall of the trailer and around the top and side edges thereof causes additional vortex effects and thus air drag along the top and side walls of the trailer rearwardly of the edges of the front wall.

Such air resistance and air drag, of course, imposes a corresponding load on the power plant of a tractor towing a trailer at a given velocity relative to ground. Moreover, if the tractor-trailer is moving against a head wind, the relative velocity of air causing such resistance and drag forces is increased above the velocity of the tractor relative to ground by the velocity of such a head wind, thus further increasing the load on the power plant of the tractor. The load on the power plant of a tractor of course translates to fuel consumption and, with respect to a given tractor-trailer combination, an undesirably high fuel consumption is required to overcome such resistance and drag forces in order to maintain a desired velocity of the vehicles relative to ground.

SUMMARY OF THE INVENTION

In accordance with the present invention, a screen of air at a velocity higher than the velocity of air flowing relative to a truck type vehicle moving at a given velocity relative to ground is employed to reduce air turbulence and air resistance and drag, thus to improve fuel consumption in connection with the operation of such vehicle. With regard in particular to a tractor-trailer combination, the high velocity air screen is directed from the tractor toward and along the top and side edges of the front wall of the trailer. The high velocity air screen provides a high energy air shroud between the tractor and trailer which, in effect, streamlines the open area therebetween so as to minimize air turbulence in the space between the vehicles and the impingement of air directly against the front wall of the trailer. In this respect, for example, if it is presumed that a tractor-trailer is moving relative to ground at a velocity of sixty miles per hour and that wind velocity is zero, the velocity of air relative to the tractor in the direction toward the trailer is sixty miles per hour. By directing a screen of air across the space between the tractor and trailer at a velocity higher than sixty miles per hour, the higher energy of the air screen causes air flowing relative to the tractor at sixty miles per hour to be deflected so as to flow along the air screen rather than against the front face of the trailer and/or into the space between the tractor and trailer. Further, the higher energy of the air screen with respect to air flowing relative to the tractor at sixty miles per hour restrains deflection of the air screen laterally inwardly of the front wall of the trailer by the lower velocity air flow thereagainst. Still further, the high energy air screen resists penetration and/or deflection by "cross wind" air flowing at an angle to the direction of towing. Therefore, air drag caused by turbulence in the space between the tractor and trailer is reduced as is the air resistance caused by impingement of air directly against the front wall of the trailer and the turbulence caused by the flow of air laterally from the front wall of the trailer and about the top and side edges thereof.

In addition to providing a streamlining air shroud effective to deflect air in the foregoing manner, it is believed that the high velocity air screen also creates a vacuum-like condition in the space between the tractor and trailer which is effective to cause any air which may enter the space between the vehicles to flow laterally toward the peripheral edges of the front wall of the trailer. In this respect, it will be appreciated that some air flow into the space is probably unavoidable. For example, air flowing beneath the tractor could flow upwardly into the space. While the effect of such air flow into the space might be minimal in comparison with that normally flowing into the space from the top and sides of the tractor, the high velocity air screen is believed to reduce the effect thereof by inducing such air to flow toward and about the peripheral edges of the front wall of the trailer.

In a preferred embodiment of the present invention, a high velocity air screen of the foregoing character is produced in response to movement of a draft vehicle along a roadway by tubular air flow control devices provided on the top and sides of the cab of the draft vehicle. The devices have air inlet ends in the direction of towing and air outlet ends for directing air toward the periphery of the front wall of the towed vehicle. The outlet ends have a smaller area than the inlet ends for increasing the velocity of air entering the inlet ends, and the outlet ends provide openings which are elongated and narrow such that screens of air are directed along the corresponding front wall edge of the towed vehicle. In the preferred embodiment herein illustrated and described, the air flow control devices are rectangular in cross-section and the areas of the openings at the outlet ends are one-half the area of the openings at the inlet ends, whereby the velocity of the air screen is twice the velocity of the air entering the inlet ends. The latter velocity is of course the velocity of air relative to the draft vehicle moving at a given velocity relative to ground. For whatever reason or on whatever principle the present invention may work, it has been found that controlling air flow between draft and trailing vehicles in accordance with the preferred embodiment of the present invention enables improving fuel economy by as much as twelve to sixteen percent with respect to a given tractor-trailer combination. This amounts to a considerable savings in fuel costs and is believed to provide a substantial improvement in such savings with respect to previous efforts to improve fuel consumption by air flow control arrangements associated with tractor-trailer combinations.

DESCRIPTION OF PRIOR ART

The most pertinent prior art known to applicant with regard to efforts to reduce air drag in connection with truck-type wheeled vehicles include air directing devices mounted on the cab and trailer of a tractor-trailer combination, as shown in U.S. Pat. No. 2,863,695 to Stamm, and air pressure controlling devices mounted about the top and side edges of the front wall of a trailer as shown in U.S. Pat. No. 4,022,508 to Kirsch et al.

In the arrangements according to the Stamm patent, air is directed laterally outwardly and upwardly from the tractor toward additional air directing devices adjacent the peripheral edges of the trailer. The air directing devices on the tractor are divergent nozzles with respect to the direction of air flow therethrough, whereby air flowing toward the trailer has a velocity no higher than that of the velocity of air relative to the tractor moving at a given velocity relative to ground. Therefore, while such air may be in the form of a sheet or screen it has no more energy than that of ambient air flowing relative to the tractor. Such an air screen is believed to be subject to penetration and/or deflection by the flow of air thereagainst at the same velocity and parallel to the top and side walls of the tractor, and more readily subject to penetration and/or deflection by a cross wind than is a higher energy air screen according to the present invention. Moreover, desired air flow characteristics about the peripheral edges of a draft vehicle are realized in accordance with the present invention without additional air directing devices on the trailing vehicle.

The arrangements disclosed in the aforementioned patent to Kirsch et al provide air directing devices along the peripheral edges of a trailer. These devices have air inlet ends facing laterally inwardly and parallel to the front wall of the trailer to receive air which impinges against the front wall in response to movement of a tractor-trailer along a roadway. The devices have constricted outlet ends for increasing the velocity of air flowing therethrough and for guiding the air around the peripheral edges to reduce air separation along the top and side walls of the trailer. Such guiding is further asserted to reduce the air pressure on the front face of the trailer to develop a net forward thrust which reduces air drag. Thus, Kirsch et al allow air to flow past the tractor and toward the front face of the trailer and freely into the space therebetween, and rely on their air directing device to overcome the resulting turbulence and lateral flow with respect to the front face of the trailer. Accordingly, both the structure and the principle of operation of the air directing devices of Kirsch et al are distinctly different from the present invention which, in such a tractor-trailer environment, provides a high velocity air screen from the tractor to shroud the space therebetween against the flow of air into the space and directly against the front wall of the trailer.

OBJECT OF THE INVENTION

An object of the present invention is to reduce air turbulence, resistance and drag encountered in connection with movement of a truck type wheeled vehicle along a roadway.

A further object is to minimize the fuel consumption of the power plant of a truck type wheeled vehicle moving along a roadway at a given velocity relative to ground.

Another object of the invention is to provide a high velocity air screen between a forward portion of a truck type vehicle and a wall portion of the vehicle therebehind which is larger in lateral and/or vertical profile than the forward portion, and which air screen more effectively reduces air turbulence, resistance and drag resulting from said profile than heretofore possible.

Another object of the invention is the provision of air screen producing means for a draft vehicle and operable to provide an air screen across the space between the draft vehicle and a trailing vehicle therebehind, and which air screen has a velocity higher than the velocity of air relative to the draft vehicle moving at a given velocity relative to ground.

A further object is the provision of air screen producing means of the foregoing character operable to produce an air screen across the space between draft and trailing vehicles and which screen has a velocity sufficiently high to streamline the space with respect to ambient air flow thereacross.

Still another object is the provision of air screen producing means of the foregoing character operable to produce a high velocity air screen across the space between draft and trailing vehicles which resists deflection and/or penetration by ambient air flowing at an angle to the direction of towing.

Yet a further object is the provision of a device or devices mountable on a draft vehicle for producing a high velocity air screen in response to movement of the draft vehicle relative to ground and the velocity of which air screen is higher than and proportional to the velocity of air relative to the draft vehicle moving at a given velocity relative to ground.

Another object is the provision of a method of controlling the flow of ambient air relative to a truck type vehicle during movement thereof along a roadway to reduce air turbulence, resistance and drag encountered in connection with such movement.

Yet another object is the provision of a method of reducing air turbulence, resistance and drag encountered in connection with the movement of a truck type vehicle along a roadway, thus to reduce fuel consumption for the power plant of the vehicle.

A further object is the provision of a method of reducing air turbulence, resistance and drag encountered in connection with the towing of a trailing vehicle, thus to improve air flow characteristics across the space between the vehicles and reduce fuel consumption in connection with towing such a trailing vehicle.

BRIEF DESCRIPTION OF THE DRAWINGS

The foregoing objects, and others, will in part be obvious and in part pointed out more fully hereinafter in conjunction with the written description of a preferred embodiment of the invention shown in the accompanying drawings in which:

FIG. 1 is a perspective view of a tractor-trailer combination showing air screen producing devices mounted on the top and sides of the cab of the tractor;

FIG. 2 is a perspective view of the rear of the tractor shown in FIG. 1;

FIG. 3 is a side elevation view of the tractor-trailer schematically illustrating the operation of the air screen producing device on the top of the tractor cab;

FIG. 4 is a plan view of the tractor-trailer schematically illustrating the operation of the air screen producing devices on the sides of the tractor cab;

FIG. 5 is a detailed perspective view of one of the air screen producing devices; and, FIG. 6 is a sectional elevation view of the air screen producing device taken along line 6—6 in FIG. 5.

DESCRIPTION OF THE PREFERRED EMBODIMENT

Referring now in greater detail to the drawings wherein the showings are for the purpose of illustrating a preferred embodiment of the invention only and not for the purpose of limiting the invention, a tractor-trailer combination is shown in the drawings which includes a tractor 10 and a trailer 12 respectively defining draft and trailing vehicles in such combination. Tractor 10 includes a cab portion 14 having a top wall 16, laterally spaced apart side walls 18 and 20 and a rear wall 22. Trailer 12 includes a front wall 24 having laterally spaced apart vertical side edges 24a and 24b and a horizontal top edge 24c therebetween. The trailer further includes laterally spaced apart side walls 26 and 28 extending rearwardly respectively from side edges 24a and 24b and a top wall 30 extending rearwardly from top edge 24c. Edges 24a, 24b and 24c define peripheral edges of front wall 24 and thus peripheral portions of the front end of the trailer. In the embodiment illustrated, front wall 24 of the trailer has a lateral width and vertical height greater than the corresponding dimensions of rear wall 22 of the cab, whereby edges 24a and 24b are disposed laterally outwardly with respect to the corresponding side of the cab and edge 24c is disposed above the top of the cab.

When the tractor and trailer are coupled together for the tractor to tow the trailer, the front face of the trailer as defined by wall 24 is spaced behind rear wall 22 of the tractor, as shown in the drawings. As is well known, ambient air moving relative to the side walls and top wall of the cab as the result of movement of the cab along a roadway both enters the space between the rear wall of the cab and the front wall of the trailer and impinges directly against the front wall of the trailer. Such air flow causes air turbulence in the space between the cab and trailer and resistance to movement of the vehicles along the roadway. Further, such turbulent air and air impinging against front wall 24 of the trailer flows laterally outwardly and upwardly along wall 24. The latter flow is thus transverse to the direction of ambient air moving relative to the vehicles as a result of movement thereof along the roadway. Accordingly, the air flowing laterally outwardly and upwardly of front wall 24 encounters ambient air moving transverse thereto creating further air turbulence in the areas along the edges of front wall 24 and rearwardly along the surfaces of the side walls and top wall of the trailer. Such air turbulence, resistance and drag increase the load imposed on the power plant of the tractor with respect to the load which would be imposed in the absence of such air flow conditions. Moreover, the air turbulence has a buffeting effect on the trailer which effects the comfort of occupants of the tractor and makes steering of the tractor-trailer more difficult for the driver.

In accordance with the present invention, such air turbulence and the effects thereof are reduced by producing an air screen in the direction from the tractor to the trailer at a velocity higher than the velocity of air flowing relative to the tractor when the latter is moving at a given velocity relative to ground. In the embodiment of the present invention illustrated in the drawings, the high velocity air screen is produced by means of air flow control devices 32, 34 and 36 mounted, respectfully, on top wall 16 and side walls 18 and 20 of cab 14.

The air flow control devices are of tubular construction and are structurally similar, and the structure and operation thereof will be understood from the ensuing description of air flow control device 32 which is shown in detail in FIGS. 5 and 6 of the drawing. With reference to the latter Figures, in conjunction with FIGS. 1 and 3, air flow control device 32 has an air inlet end 38 facing in the direction of towing when the device is mounted on cab 14, and an outlet end 40 for directing air toward the peripheral portion of the trailer defined by edge 24c of front wall 24 thereof. The device may be constructed from any suitable materials such as fiber glass or sheet metal, for example, and includes an inner wall 42 and an outer wall 44 with respect to top wall 16 of the cab. Walls 42 and 44 extend between the inlet and outlet ends of the device and have a width generally corresponding to the width of top wall 16 of the cab. Further, walls 42 and 44 are spaced apart and interconnected by laterally opposite side walls 46 and 48 extending between the inlet and outlet ends of the device and parallel to one another, whereby the device has a width dimension uniform along the length thereof. Preferably, a plurality of air guide vanes 50 are provided between walls 42 and 44 and extend between the inlet and outlet ends of the device. The air guide vanes are laterally spaced apart in the direction between side walls 46 and 48 and are parallel to the side walls and serve both to rigidify the air flow control device and to define a plurality of passageways through the device to minimize turbulence in the air flowing through the device as set forth more fully hereinafter.

As best seen in FIG. 6, inner and outer walls 42 and 44 of the air flow control device include respective portions 42a and 44a extending from inlet end 38 toward outlet end 40 in parallel relationship to one another, and respective portions 42b and 44b extending from the corresponding portions 42a and 44a to outlet end 40 of the device. Wall portions 42b and 44b converge with respect to one another in a direction toward outlet end 40 and curve outwardly with respect to the corresponding one of the wall portions 42a and 44a. It will be appreciated, therefore, that side walls 46 and 48 and air guide vanes 50 have corresponding contours between the air inlet and outlet ends of the device. It will be further appreciated that the converging wall portions 42b and 44b provide for the dimension between inner and outer walls 42 and 44 at outlet end 40 to be less than the dimension between these walls at air inlet end 38 of the device. Accordingly, since walls 42 and 44 are of uniform width between the inlet and outlet ends, the smaller dimension between the latter walls at outlet end 40 provides for the air outlet opening to be of an area less than the area of the air inlet opening. Therefore, air entering inlet end 38 of the device at a given velocity and in the direction of arrows A in FIG. 6 is pressurized in flowing toward outlet end 40 by the convergent wall portions 42b and 44b and is discharged through outlet end 40 as a screen of air moving in the direction of arrows B and at a velocity higher than the given velocity. The increase in velocity is proportional to the difference between the areas of the inlet and outlet openings. Thus, for example, if the area of the outlet opening is one-half the area of the inlet opening, the velocity of the air screen is twice the velocity of air entering the inlet end. The velocity of air entering inlet end of the device is of course the velocity of air relative to the tractor moving along a roadway at a given velocity relative to ground. Accordingly, if the tractor is traveling at sixty miles per hour in still air, the relative velocity of air entering inlet end 38 of the device is sixty miles per hour and, in the example mentioned, the air screen velocity would be one-hundred twenty miles per hour. Similarly, if the tractor is moving relative to ground at sixty miles per hour and into a head wind of ten miles per hour, the relative velocity of air entering inlet end 38 is seventy miles per hour and the air screen has a velocity of one-hundred forty miles per hour.

Preferably, air flow control devices 34 and 36 are mounted on the sides of cab 14 so as to extend downwardly from the plane of wall 44 of air flow control device 32 to locations corresponding to the lower ends of side edges 24a and 24b of trailer wall 24. While the devices 34 and 36 are of the same basic structure as that described above with regard to air flow control device 32, it will be appreciated from FIGS. 1, 2 and 4 of the drawing that the vertical or width dimensions of devices 34 and 36 may be different from the corresponding dimension of device 32, which dimensions at least in part are determined by cab structure and dimensions. Further, the curvature of the convergent portions of the inner and outer walls of devices 34 and 36 may be different than that of device 32 in that the side edges 24a and 24b of trailer wall 24 towards which the air screens of devices 34 and 36 are directed are laterally closer to the planes of the side walls of the tractor than is top edge 24c to the plane of top wall 16 of the tractor. These differences in dimension and contour, however, do not effect the operation of the air flow control devices. In this respect, the inner and outer walls of devices 34 and 36 converge to pressurize inlet air, and the outlet opening is of an area smaller than the inlet opening to provide the discharge of an air screen at a velocity higher than that of the inlet air. Accordingly, it will be appreciated too that the spacing between the inner and outer walls of the devices 34 and 36 can be less than the spacing between inner and outer walls 42 and 44 of device 32 if, for example, it is desired to have a laterally thinner profile for the air flow control devices mounted on the sides of the cab. Preferably, however, the proportional relationship between the areas of the inlet and outlet openings of the devices 34 and 36 is the same as that for the device 32 so that the velocities of the air screens are the same. While the construction and mounting of individual air flow control devices for the top and sides of the tractor cab is most economical, it will be appreciated that the devices could readily be constructed to provide a unitary air flow control device and to provide for the outlet ends of the top and side portions thereof to be interconnected to provide a continuous U-shaped outlet opening. Likewise, it will be appreciated that the sides of device 32 and the upper ends of devices 34 and 36 herein disclosed could be constructed to provide for the outlet openings thereof to be continuous around the side edges of the top wall of the cab. Alternately, appropriately profiled air flow control inserts for the latter purpose could be constructed for assembly between the sides of air flow control device 32 and the upper ends of devices 34 and 36.

With regard now to FIGS. 1, 3 and 4 of the drawing in connection with operation of the air flow control devices, movement of the tractor-trailer along a roadway at, for example sixty miles per hour relative to ground and through still air provides for the velocity of air relative to the tractor and thus the velocity of air entering the inlet ends of air flow control devices 32, 34 and 36 to be sixty miles per hour. As seen in FIG. 3, the air entering flow control device 32 are indicated by arrow A is pressurized therein and is discharged from the outlet end in the form of a screen of air directed toward top edge 24c of trailer wall 24 as indicated by arrow B. The air screen, as explained hereinabove, has a velocity proportionately higher than the sixty miles per hour velocity of the input air. The high velocity air screen thus produced is preferably directed along edges 24c and upwardly thereof so as not to impinge on tractor wall 24. The high velocity of the air screen streamlines the space between the tractor and trailer across which the screen flows and, together with the curvature of the outlet end of the device causes ambient air at the sixty miles per hour velocity relative to the tractor and above the flow control device, as indicated by arrows C, to be deflected and follow the air screen path. Accordingly, the air screen effectively blocks the flow of ambient air, such as that indicated by arrows C and that between arrows C, against the front face of the trailer and into the space between the tractor and trailer. As the air screen flows upwardly across top edge 24c of the trailer, it is deflected rearwardly and along top wall 30 of the trailer as shown in FIG. 3 by the flow of ambient air thereagainst. Such deflection of the air screen across top edge 24c and toward top wall 30 of the trailer minimizes turbulence normally created rearwardly of edge 24c along the top wall of the trailer by the uncontrolled flow of air upwardly and off the front face of the trailer.

Similarly, as will be seen in FIG. 4 of the drawing, air at the velocity of sixty miles per hour relative to the cab enters the inlet ends of flow control devices 34 and 36 as indicated by arrows A and is discharged from the outlet ends thereof as a high velocity air screen directed toward the corresponding one of the edges 24a and 24b of trailer wall 24 as indicated by arrows B. Again, these air screens are directed slightly outwardly of the corresponding wall edge so as to avoid impingement with the front wall of the trailer. As the screens flow across edges 24a and 24b they are deflected rearwardly and toward the corresponding one of the trailer side walls 26 and 28, as shown in FIG. 4, by the flow of ambient air thereagainst, thus to minimize turbulence in the area of the side walls extending rearwardly of the front wall. It will be further appreciated that the air screen produced by air flow control devices 34 and 36 streamline the space between the sides of the cab and trailer and, together with the curvature of the outlet ends of the devices, cause ambient air to be deflected and follow the high velocity air screen path. The air screens thus prevent penetration of ambient air laterally into the space between walls 22 and 24 of the cab and trailer and the impingement of ambient air against the corresponding side portion of trailer wall 24.

It is further believed that the high velocity air screens in flowing from the rear of the tractor cab across the peripheral portions of the front wall of the trailer create a vacuum or suction effect in the space between the tractor and trailer and adjacent the inward sides of the air screens, whereby any air which may enter the space is drawn toward an air screen and flows therewith across the corresponding edge of the front wall of the trailer, as indicated by arrows D in FIGS. 3 and 4 of the drawing. Such air may enter the space between the tractor and trailer from beneath the tractor, for example, and such a vacuum effect advantageously influences the flow thereof from the space to reduce turbulence of such air in the space.

In actual road testing over a three month period of prototypes of the air flow control devices, described herein, fuel consumption was improved by from twelve percent to sixteen percent in connection with the towing of trailers by a given tractor and in comparison with the towing of trailers by the given tractor and without air flow control devices. More particularly, the prototype devices were mounted on the top and sides of a tractor manufactured by White Motor Corporation of East Lake, Ohio under the name "Road Boss 2". The devices were mounted in association with the back wall of the tractor generally as shown in the drawings; however, the side mounted devices extended downwardly only to about the level of the window sill of the cab as opposed to the lower extent thereof shown in the drawings with respect to air flow control devices 34 and 36, and the upper ends of the side mounted devices were spaced slightly below the top mounted device. The areas of the outlet openings of the three prototype devices were each one-half the area of the inlet openings of the corresponding device. Accordingly, the velocities of the air screens produced by the prototype devices were twice the velocity of air flowing relative to the tractor with the latter moving at a given velocity relative to ground. Without the air flow control devices, the fuel mileage for the "Road Boss 2" tractor ranged from 4.9 to 5.25 miles per gallon in connection with the towing of trailers, and with the prototype air flow control devices on the cab, the mileage increased to a range from 5.7 to 5.902 miles per gallon. This provides an average increase of about 14.3% in fuel mileage which of course reflects a considerable increase in fuel economy.

While considerable emphasis has been placed herein on the structure of the illustrated air flow control devices and the association thereof with the cab of a tractor for use in a tractor-trailer combination, it will be appreciated that other embodiments of the invention as well as modifications of the embodiment disclosed herein can be made without departing from the principles of the invention and can be employed in connection with other truck type vehicles. In connection with the latter, any truck structure providing a wall spaced behind and/or of larger profile than the truck can whereby air turbulence, resistance and drag occur during movement thereof, can be provided with high velocity air screen producing devices according to the present invention to reduce the air flow problem. With respect to the devices illustrated herein for such purposes, a portion of the inner walls of the devices can be defined by the corresponding one of the top and side walls of a tractor or other truck cab, in connection with a device manufactured separate from and mounted on the cab. Moreover, it will be appreciated that the air flow control devices could be constructed in conjunction with the manufacture of the cab so as to be an integral part thereof as opposed to an attachment thereto. Still further, while it is economical to provide a tubular air flow control device which produces a high velocity air screen in response to movement of a vehicle along a roadway in the manner herein illustrated and described with respect to a tractor-trailer combination, it will be appreciated that such a high velocity air screen could otherwise be produced to achieve the same function. For example, an air compressor could be employed in association with an outlet nozzle or nozzles along the top and sides of the cab of a truck type vehicle to produce an air screen at a desired velocity higher than the velocity of air relative to the truck during movement thereof along a roadway.

Since many embodiments of the present invention can be made, and since many changes can be made in the embodiment herein illustrated and described, it is to be distinctly understood that the foregoing descriptive matter is to be interpreted merely as illustrative of the present invention and not as a limitation.

Having thus described the invention, it is claimed:

1. An air screen producing device mountable on a draft vehicle adapted to tow a trailer vehicle therebehind in a forward direction of movement of said draft and trailer vehicles relative to ground, said draft vehicle having an upright rear wall and said trailer vehicle having an upright front wall spaced rearwardly from said rear wall to provide an open space therebetween, said air screen producing device including tubular air passageway means on said draft vehicle and having front and rear ends with respect to said forward direction, said air passageway means including an air inlet opening at said front end and an air outlet opening at said rear end and adjacent said rear wall of said draft vehicle, said air outlet opening being an elongate narrow opening having major and minor dimensions, said tubular passageway means including air pressurizing means between said inlet and outlet openings for pressurizing ambient air entering said inlet opening during movement of said draft and trailer vehicles in said forward direction at a given velocity relative to ground, said pressurizing means providing for said pressurized air to be discharged from said elongate narrow outlet opening as a screen of air having a velocity higher than the velocity of ambient air relative to said draft and trailer vehicles moving at said given velocity, said front wall of said trailer vehicle including edge means having a given length, said air outlet opening facing said edge means with said major dimension of said outlet opening parallel to said edge means, whereby said screen of higher velocity air flows from said outlet opening rearwardly across said open space to said edge means and parallel thereto, and said major dimension of said outlet opening providing for said screen of air jet said edge means to extend along said given length of said edge means.

2. An air screen producing device according to claim 1, wherein said tubular air passageway means includes wall means extending between said air inlet and outlet openings, said wall means providing said air pressurizing means and including first walls spaced apart transverse to said major dimension of said outlet opening and converging in the direction from said air inlet opening toward said air outlet opening.

3. An air screen producing device according to claim 2, wherein said wall means includes second walls spaced apart in the direction of said major axis, said first and second walls providing for said air inlet opening to be an elongate narrow opening having major and minor dimensions, said major dimensions of said inlet and outlet openings being the same, and said minor dimension of said outlet opening being less than that of said inlet opening.

4. An air screen producing device according to claim 3, wherein said minor dimension of said outlet opening is one-half said minor dimension of said inlet opening.

5. An air screen producing device according to claim 3, wherein said first and second walls provide for said air passageway means to be rectangular in cross-section.

6. An air screen producing device according to claim 5, wherein said second walls are parallel to one another between said air inlet and outlet openings, and a plurality of air guide vanes between said first walls and parallel to said second walls, said guide vanes extending from said inlet opening to said outlet opening.

7. An air screen producing device according to claim 5, wherein said first walls have corresponding first portions extending parallel to one another from said inlet opening to a location between said inlet and outlet openings and second portions converging with respect to one another from said location to said outlet opening.

8. An air screen producing device according to claim 7, wherein said second portion of each of said first walls is arcuate between said location and said outlet opening.

9. An air screen producing device according to claim 8, wherein said minor dimension of said outlet opening is one-half said minor dimension of said inlet opening.

10. An air screen producing device according to claim 9, wherein said second walls are parallel to one another between said air inlet and outlet openings, and a plurality of air guide vanes between said first walls and parallel to said second walls, said guide vanes extending from said inlet opening to said outlet opening.

11. A method of reducing air turbulence between a draft vehicle towing a trailing vehicle therebehind, said draft vehicle including an upright rear wall and said trailing vehicle including an upright front wall having a peripheral edge portion having a given length, said front wall being spaced rearwardly from said rear wall of said draft vehicle to provide an open space therebetween, said method comprising: producing a screen of air at a velocity greater than the velocity of ambient air relative to said draft vehicle when said draft vehicle is moving forwardly at a given velocity relative to ground, and directing said screen of air rearwardly from a location adjacent said rear wall of said draft vehicle across said open space to said peripheral edge portion of said front wall of said trailing vehicle and parallel to and along said given length of said edge portion.

12. The method according to claim 11, and producing said screen of air at a velocity twice said velocity of ambient air relative to said draft vehicle.

13. The method according to claim 11, and producing said air screen in response to movement of said draft vehicle at said given velocity relative to ground.

14. The method according to claim 13, and producing said screen of air at a velocity twice said velocity of ambient air relative to said draft vehicle.

* * * * *